(12) United States Patent
Miller et al.

(10) Patent No.: US 7,483,795 B2
(45) Date of Patent: Jan. 27, 2009

(54) PRESSURE AND TEMPERATURE COMPENSATION ALGORITHM FOR USE WITH A PIEZO-RESISTIVE STRAIN GAUGE TYPE PRESSURE SENSOR

(75) Inventors: Wojtek Miller, Knoxville, TN (US); Kenneth Alan Cupples, Knoxville, TN (US); James Robert Champion, Maryville, TN (US)

(73) Assignee: Robertshaw Controls Company, Carol Stream, IL (US)

( * ) Notice: Subject to any disclaimer, the term of this patent is extended or adjusted under 35 U.S.C. 154(b) by 157 days.

(21) Appl. No.: 11/200,335

(22) Filed: Aug. 9, 2005

(65) Prior Publication Data

US 2006/0052968 A1    Mar. 9, 2006

Related U.S. Application Data

(60) Provisional application No. 60/600,157, filed on Aug. 10, 2004.

(51) Int. Cl.
*G01D 1/00* (2006.01)

(52) U.S. Cl. ............................ 702/50; 702/53; 702/47; 340/612; 340/614; 340/618; 340/626; 73/290 R; 73/292; 73/299

(58) Field of Classification Search .................. 702/50, 702/117, 98, 99, 104, 53, 47; 73/25.1, 23.27, 73/31.04, 40, 49.2, 290 R, 292, 299, 708; 340/612, 614, 618, 626
See application file for complete search history.

(56) References Cited

U.S. PATENT DOCUMENTS

| | | | | |
|---|---|---|---|---|
| 4,296,413 A * | 10/1981 | Milkovic | ................ | 340/870.38 |
| 4,766,763 A * | 8/1988 | Kurtz | .......................... | 73/49.2 |
| 4,986,131 A * | 1/1991 | Sugiyama et al. | ............. | 73/766 |
| 5,253,532 A * | 10/1993 | Kamens | ....................... | 73/708 |
| 5,428,985 A * | 7/1995 | Kurtz et al. | ................. | 73/25.01 |
| 5,460,049 A * | 10/1995 | Kirsch | .......................... | 73/708 |
| 5,475,623 A * | 12/1995 | Stocker | ........................ | 702/98 |
| 5,686,826 A | 11/1997 | Kurtz et al. | | |
| 5,756,878 A | 5/1998 | Muto et al. | | |
| 5,764,067 A * | 6/1998 | Rastegar | ...................... | 324/725 |
| 6,401,541 B1 | 6/2002 | Kurtz | | |
| 6,700,473 B2 * | 3/2004 | Kurtz et al. | .................... | 338/42 |
| 2006/0025955 A1 * | 2/2006 | Kurtz et al. | ................. | 702/117 |

OTHER PUBLICATIONS

U.S. Appl. No. 11/199,761, filed Aug. 9, 2005, Champion et al.

* cited by examiner

*Primary Examiner*—Drew A Dunn
*Assistant Examiner*—Hien X Vo
(74) *Attorney, Agent, or Firm*—Reinhart Boerner Van Deuren P.C.

(57) ABSTRACT

A method of determining a temperature and a pressure in a tank is provided. The method comprises the steps of obtaining sensor data and calculating coefficients. Then, a bridge resistance is ratiometrically determined from a bridge voltage. A temperature is calculated with the coefficients and the bridge resistance. Thereafter, a transition from a temperature measurement mode to a pressure measurement mode is made. A voltage per resistance is calculated with the coefficients and a differential voltage. Then, a normalized voltage is calculated using the voltage per resistance, the differential voltage, and the bridge resistance to indirectly compensating for temperature. A pressure is calculated with the coefficients and the normalized voltage.

18 Claims, 2 Drawing Sheets

US 7,483,795 B2

PRESSURE AND TEMPERATURE COMPENSATION ALGORITHM FOR USE WITH A PIEZO-RESISTIVE STRAIN GAUGE TYPE PRESSURE SENSOR

CROSS-REFERENCE TO RELATED PATENT APPLICATIONS

This patent application claims the benefit of U.S. Provisional Patent Application No. 60/600,157, filed Aug. 10, 2004, the teachings and disclosure of which are hereby incorporated in their entireties by reference thereto.

FIELD OF THE INVENTION

This invention relates generally to a piezo-resistive strain gauges, and more particularly to a pressure and temperature compensation algorithm to determine a pressure in a tank after compensating for temperature affects of the fluid.

BACKGROUND OF THE INVENTION

A tank or similar vessel is often employed at a factory, construction site, warehouse, and the like, to receive, store, and distribute a product. These tanks are adapted to accommodate a variety of different products such as, for example, gasoline, propane, fertilizer, chemicals, fuels, and the like. The tanks that hold these products are often being drained of, and subsequently replenished with, the product. Therefore, sensors are employed to monitor a pressure within the tank so that the amount of product currently in the tank can be determined. One such sensor that has found wide use is a piezo-resistive strain gauge type pressure sensor.

When a piezo-resistive strain gauge type pressure sensor is used to determine the level of fluid in a tank, measurements of the pressure at the bottom of the tank and the temperature of the fluid are taken. The results of these two measurements can be a base for a fluid level, fluid volume, tank inventory control, and additional information. A silicon piezo-resistive pressure sensor can be used for both the fluid temperature and the pressure measurements. Unfortunately, the temperature of the sensor biases both the bridge resistance and the pressure reading. This temperature bias of the bridge resistance allows for a determination of the sensor temperature (and therefore fluid temperature), but the temperature bias must be removed from the pressure calculation.

However, removing the temperature bias is not an easy task. The temperature changes the bridge resistance and bridge pressure sensitivity. This temperature effect is greater when measured across the entire bridge. A three-dimensional graph of pressure, temperature, and bridge voltage creates a surface bended on each end. Previous methods involve using two, multi-order polynomials. One polynomial calculates temperature and the other pressure. This method gives relatively good results for temperature measurements, but it keeps adding the temperature bias to the pressure measurement.

Unfortunately, at least two difficulties exist with such conventional pressure transducers (i.e., sensors) used with tanks. First, standard sensor calibration requires eighteen measurements—six pressure measurements at three different temperatures. Second, a temperature calibration of the standard sensor requires nine measurements—three measurements of the bridge resistance at three different temperatures. Because so many measurements are needed for calibration, both time and money are wasted or, at the least, not used efficiently.

The invention provides a method of using a piezo-resistive strain gauge to calculate temperature and pressure. These and other advantages of the invention, as well as additional inventive features, will be apparent from the description of the invention provided herein.

BRIEF SUMMARY OF THE INVENTION

In one aspect, the invention provides a method of determining a temperature and a pressure in a tank. To begin, sensor data is obtained and coefficients are calculated. Next, a bridge resistance is ratiometrically determined from a bridge voltage. A temperature is then calculated with selected ones of the coefficients and the bridge resistance. Thereafter, a transition from a temperature measurement mode to a pressure measurement mode is made. A voltage per resistance is then calculated with selected ones of the coefficients and a differential voltage. Thereafter, a normalized voltage is calculated using the voltage per resistance, the differential voltage, and the bridge resistance to indirectly compensate for temperature. A pressure is then calculated with selected ones of the coefficients and the normalized voltage.

In another aspect, the invention provides a method of determining a temperature compensated pressure in a tank. To begin, sensor data is obtained and first coefficients are calculated for a voltage per resistance equation with the sensor data. Thereafter, second coefficients are calculated for a pressure equation with the sensor data. Then, a differential voltage is measured. A voltage per resistance is calculated with the voltage per resistance equation using the first coefficients and the differential voltage. Next, a normalized voltage is calculated with a normalized voltage equation using the voltage per resistance, the differential voltage, and the bridge resistance. Then, a pressure is calculated with the second coefficients and the normalized voltage.

In yet another aspect, the invention provides a method of determining a temperature in a tank. To begin, sensor data is obtained and first coefficients are calculated for a temperature equation with the sensor data. Then, a bridge voltage is measured. A bridge resistance is ratiometrically determined with the bridge voltage. Thereafter, a temperature is calculated using the first coefficients and the bridge resistance.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
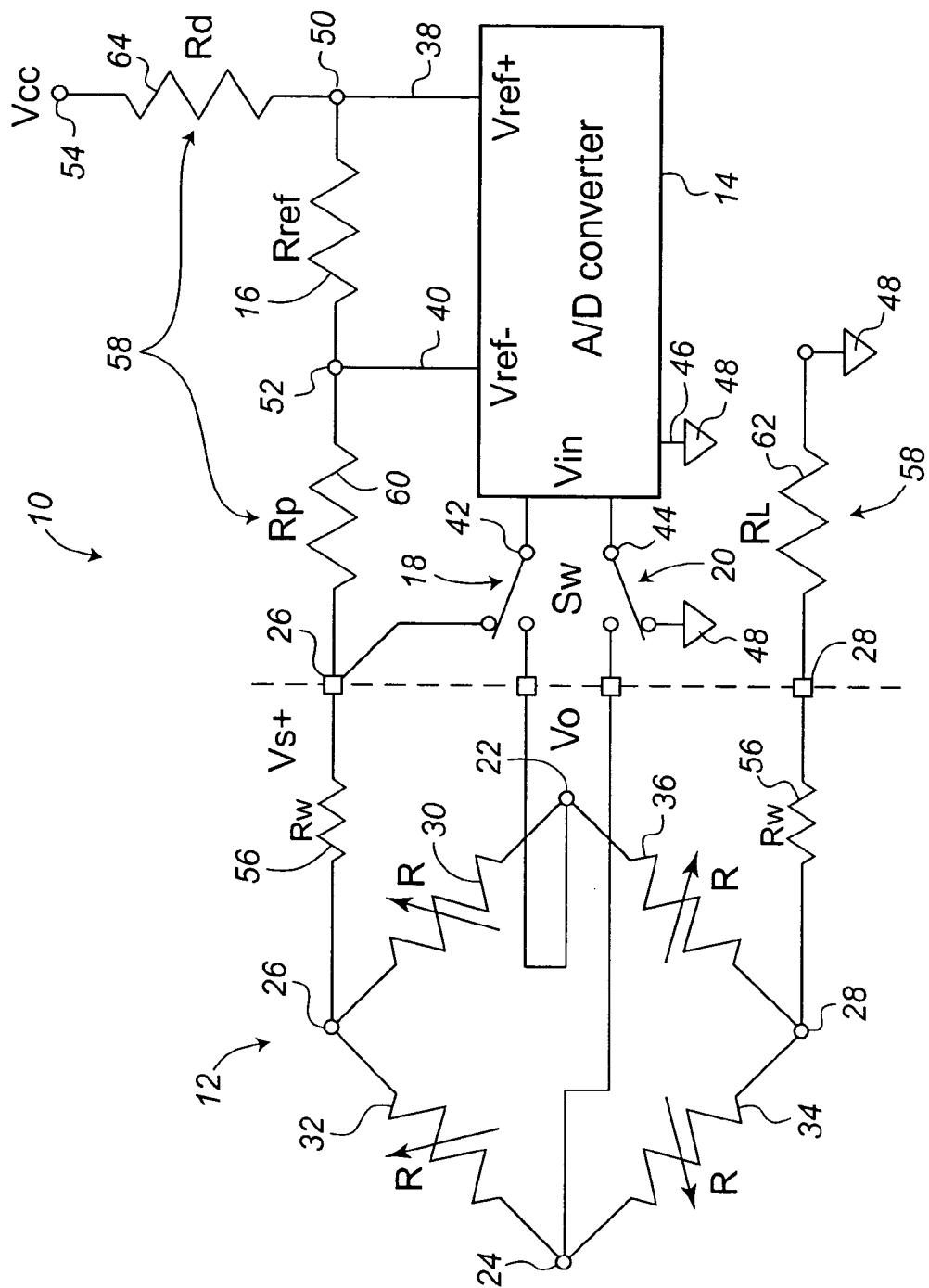
FIG. 1 is a simplified schematic view of an exemplary embodiment of an a pressure and temperature measurement apparatus constructed in accordance with the teachings of the present invention.

Referring to FIG. 1, a temperature and pressure measuring circuit 10 is illustrated. The circuit 10 provides an inexpensive and economically desirable alternative to more expensive circuits or devices used to measure temperature and pressure within a tank. Moreover, as will be more fully explained below, since the circuit 10 includes only passive components, the circuit is safe to operate within the tank, even when the tank receives, stores, and dispenses a flammable product.

As shown in FIG. 1, the circuit 10 comprises a transducer 12, an analog-to-digital (A/D) converter 14, a reference resistive device 16, a first switch 18, and a second switch 20. The transducer 12 is a completely uncompensated transducer adapted to measure both a temperature and a pressure of a product in a tank. The transducer 12 can be a silicon piezoresistive sensor, a strain gauge, a Wheatstone bridge, a sensor in a Wheatstone bridge type configuration, and the like.

In a preferred embodiment, the transducer 12 is a piezoresistive Wheatstone bridge pressure sensor commercially available from Druck, Inc., of New Fairfield, Conn., a subsidiary of the General Electric Company of Fairfield, Conn.

As depicted in FIG. 1, the transducer 12 includes a first bridge node 22, a second bridge node, a third bridge node 26, and a fourth bridge node 28. In such an embodiment, a first resistive device 30 is disposed between the first and third bridge nodes 22, 26 and a second resistive device 32 is disposed between the second and third bridge nodes 24, 26. Likewise, a third resistive device 34 is disposed between the second and fourth bridge nodes 24, 28 and a fourth resistive device 36 is disposed between the first and fourth bridge nodes 22, 28.

Preferably, each of the resistive devices 30, 32, 34, 36 has an electrical resistance that fluctuates and/or varies based on a change in one or both of a temperature in the tank and a pressure in the tank. Therefore, when either or both of the temperature and pressure rise or fall proximate one of the resistive devices 30, 32, 34, 36, the electrical resistance of that particular resistive device correspondingly changes.

The A/D converter 14 comprises first and second reference inputs 38, 40, first and second differential inputs 42, 44, and a ground pin 46 coupled to a ground 48. In a preferred embodiment, the A/D converter 14 is a sigma-delta A/D converter commercially available from a variety of manufacturers. In an exemplary embodiment, the A/D converter 14 is an integrated circuit (IC) 16-bit sigma-delta A/D converter such as, for example model AD7709, commercially available from Analog Devices, Inc., of Norwood, Mass.

The A/D converter 14 is configured to provide a gain within a gain range (e.g., a gain of 2 to a gain of 128). The gain of the A/D converter 14 is adjustable such that the gain can be set low (i.e., around a gain of 2), set high (i.e., around a gain of 128), or set somewhere in between low and high settings. If an A/D converter such as model AD7709 is selected, the gain range noted above is available. Worth noting, the lower the gain such as, for example, a gain of 1 or 0.5, the easier it is to scale the resistance values for of the resistance device 16 and/or the resistive devices 60, 62, 64 in the protection network 58 to measure extremes in the temperature when measuring the overall resistance of the bridge (FIG. 1). Therefore, a lower gain can provide certain advantages (e.g., better resolution at low pressures) and inhibit or prevent undesirable effects (e.g., saturation of inputs).

The first reference input 38 of the A/D converter 14 is coupled to a first reference node 50 and the second reference input 40 is coupled to a second reference node 52. In between the first and second reference nodes 50, 52, the reference resistive device 16 is disposed. Since the reference resistive device 16 is a conventional fixed resistor having a known and/or predetermined resistance, the A/D converter 14 can make ratiometric comparisons and/or take ratiometric measurements by comparing a voltage drop between the first and second reference inputs 38, 40 to a voltage drop between the first and second differential inputs 42, 44.

The first reference node 50 receives a voltage from a voltage source 54. Since the first reference node 50 is coupled to the first reference input 38 of the A/D converter 14, the voltage source 54 provides voltage (i.e., excitation) to the A/D converter. The voltage source 54 can be a variety of voltage sources known in the art but, because of the ratiometric capabilities of the A/D converter 14, the voltage source need not be a precision voltage source for the circuit 10 to operate properly.

Figure 2:
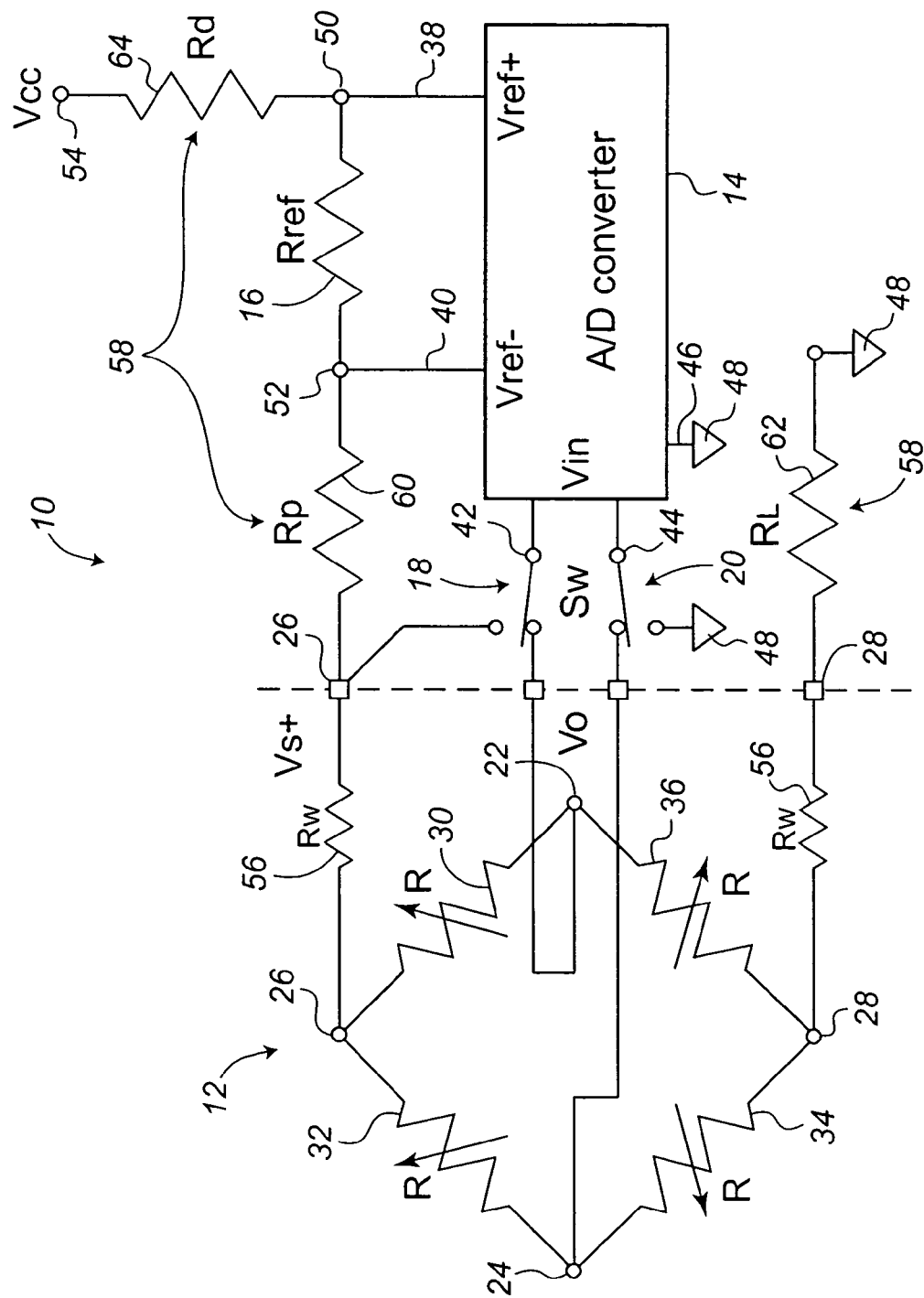
FIG. 2 is a simplified schematic view of the pressure and temperature measurement apparatus of FIG. 1 after switches have been actuated.

In both FIGS. 1 and 2, a wire resistance 56 between the transducer 12 and the A/D converter 14 is depicted. Even though measurable, the wire resistance 56 is small enough that it is generally considered negligible. Therefore, for purposes of clarity in explaining the invention, the wire resistance 56 is generally ignored. As such, the third and fourth bridge nodes 26, 28 are considered to extend though and past the illustrated wire resistances 56. In other words, the third and fourth bridge nodes 26, 28 are for all intents and purposes directly coupled to the first and second differential inputs 42, 44 when the first and second switches 18, 20 are configured as shown in FIG. 1. Additionally, a wire resistance (not shown) in the lead extending from node 22 toward differential input 42 and in the lead extending from node 24 and differential input 44 would be present. Since the wire resistances are small and the A/D converter has a very high input impedance, the wire resistances can be ignored.

The first switch 18 is adapted to selectively couple the first differential input 42 to either the third bridge node 26 as shown in FIG. 1 or the first bridge node 22 as shown in FIG. 2. Likewise, the second switch 20 is adapted to selectively couple the second differential input 44 to either the ground 48 as shown in FIG. 1 or the second bridge node 24 as shown in FIG. 2. The switches 18, 20 are actuatable and/or movable such that the circuit 10 can be transitioned between the temperature measurement mode or configuration shown in FIG. 1 and the pressure measurement mode or configuration shown in FIG. 2.

In a preferred embodiment, each of the first and second switches 18, 20 is a single pole, double throw (SPDT) switch. However, the first and second switches 18, 20 can also be other switches known in the art such as, for example, single pole change over or single pole center off (SPCO) switches. Also, in one embodiment, the first and second switches 18, 20 are replaceable with a double pole double throw (DPDT) switch or a double pole changeover or double pole center off (DPCO) switch.

As shown in FIG. 1, with the first switch 18 positioned to couple the first differential input 42 and the third bridge node 26 and the second switch 20 positioned to couple the second differential input 44 and the fourth bridge node 28, a bridge voltage (Vb) is experienced between the first and second differential inputs. Based on this total bridge voltage, a bridge resistance can be determined and/or calculated. When in this configuration, a temperature of a fluid in the tank can be determined as discussed more fully below and, as such, the circuit 10 is said to be in a temperature measurement mode.

As shown in FIG. 2, with the first switch 18 positioned to couple the first differential input 42 and the first bridge node 22 and the second switch 20 positioned to couple the second differential input 44 and the second bridge node 24, a differential output voltage (Vo) is experienced between the first and second differential inputs. Based on this differential output voltage, a differential resistance can be determined and/or calculated. When in this configuration, a pressure in the tank can be measured and, as such, the circuit 10 is said to be in a pressure measurement mode.

As shown in both FIGS. 1 and 2, the circuit can include a protection network 58 comprised of first, second, and third protective resistive devices 60, 62, 64. As depicted in FIGS. 1 and 2, each of the protective resistive devices 60, 62, 64 is a conventional fixed resistor. In a preferred embodiment, the first protective resistive device 60 is disposed between the third bridge node 26 and the second reference node 52, the second protective resistive device 62 is disposed between the fourth bridge node 28 and the ground 48, and the third protective resistive device 64 is disposed between the first reference node 50 and the voltage source 54. In addition to the first, second, and third resistive devices 60, 62, 64, the protection network 58 can be supplemented with limiting diodes (not shown) and other components to afford the circuit 10 further protection against, for example, over-voltage and over-current conditions.

In operation, the circuit 10 employs a pressure and temperature compensation algorithm of the present invention. The formation of the algorithm begins by obtaining a variety of data from a manufacturer of the transducer 12. This data typically includes, for example, a first temperature (t1), a first bridge resistance (Rb1), a second temperature (t2), a second bridge resistance (Rb2), a third temperature (t3), and a third bridge resistance (Rb3) for differential voltages (Vo1, Vo2, Vo3) at pressures (p1, p2, p3). In other words, the manufacturer provides data on how a temperature corresponds to a bridge resistance when the differential voltage and pressure are held constant. Additionally, an initial normalized bridge voltage (Vno) and a standard bridge resistance (Ro) at room temperature (i.e., ambient temperature) are given by the manufacturer.

Using the data provided by the manufacturer, a first set of coefficients is calculated (e.g., by curve fitting) for a temperature equation. Specifically, from the manufacturer data a set of three linear equations with three unknowns can be generated and solved for the coefficients of a second order polynomial that characterizes the temperature for a given bridge resistance. Such calculations can be performed with the assistance of a personal computer. In the disclosed embodiment, three coefficients, namely a, b, and c are calculated using the data obtained from the manufacturer and a second order polynomial temperature equation:

$$t = a \times Rb^2 + b \times Rb + c \quad [1.1]$$

where t is the temperature, Rb is the resistance of the bridge (i.e., transducer 12), and a, b, and c are the coefficients.

Those skilled in the art will recognize that polynomial equations of higher orders can be employed to achieve greater accuracy and/or higher resolution. In those instances, further data must be provided by the manufacturer or otherwise obtained by, for example, testing to obtain values for the added number of coefficients. Additionally, to correct for any errors, additional polynomials, preferably second order polynomials, can be employed.

In a preferred embodiment, after each of the coefficients a, b, and c have been determined, the coefficients are stored, along with the standard bridge resistance Ro, in the memory of measurement electronics (e.g., a monitor) for later recall and use. In an exemplary embodiment, the memory is a flash memory.

Now that coefficients a, b, and c have been determined and stored, the temperature in the tank is calculable. To calculate the temperature in the tank at any particular moment, the bridge voltage is measured while the circuit 10 is in the temperature measurement mode (FIG. 1). Based on the bridge voltage that is observed, the A/D converter 14 ratiometrically determines the bridge resistance (Rb) as follows:

$$\frac{Vb}{Vref} = \frac{Rb}{Rref}$$

where Vb is the bridge voltage, Rref is the resistance value of the reference resistor, and Vref is the voltage across the reference resistor Rref. At this point, if desired, the temperature can be stored, reported to a user, relayed to a data center, and the like.

Still employing the data provided by the manufacturer, a second set of coefficients (e.g., by curve fitting) is calculated. Again, such calculations can be performed with the assistance of a personal computer. In the disclosed embodiment, four additional coefficients, namely d, e, f, and g, are calculated using the data obtained from the manufacturer and the following two equations:

$$\frac{dv}{dr} = d \times Vo + e \quad [1.2]$$

$$p = f \times Vno + g \quad [1.4]$$

where dv/dr is the change in bridge voltage per one ohm of the bridge resistance (i.e., a slope), Vo is bridge voltage, p is pressure, Vno is the normalized bridge voltage (i.e., bridge voltage that has been corrected to compensate for the effect of temperature), and d, e, f and g are the coefficients.

Like before, in a preferred embodiment, after each of the above coefficients are calculated, the coefficients are stored in the flash memory of the measurement electronics. Therefore, the coefficients can be easily recalled later and used. If desired and/or convenient, all of the coefficients, a-g, can be calculated and placed in memory simultaneously or at the same time.

With the newly determined coefficients stored, the switches 18, 20 are manipulated and/or actuated to place the circuit 10 in the pressure measurement mode (FIG. 2). Such an orientation permits a differential voltage (Vo) to be measured and/or observed as shown in FIG. 2.

Once the differential voltage is known, the coefficients d and e are recalled from the flash memory of the measurement electronics. Thereafter, the differential voltage and appropriate coefficients are employed to calculate the change in voltage with respect to resistance, dv/dr, using the formula:

$$\frac{dv}{dr} = d \times Vo + e \quad [1.2]$$

Now that dv/dr has been determined, the standard bridge resistance at room temperature, Ro, is recalled from memory and the normalized bridge voltage, Vno, is calculated using the following formula:

$$Vno = Vo + \frac{dv}{dr} \times (Ro - Rb) \quad [1.3]$$

where Vno is the normalized bridge voltage, Vo is bridge voltage, dv/dr is the change in bridge voltage per one ohm of the bridge resistance (i.e., a slope), Ro is the standard bridge resistance at room temperature, and Rb is the resistance of the bridge.

Finally, knowing the calculated normalized bridge voltage, the coefficients f and g are recalled from memory and the pressure, p, is calculated using the following equation:

$$p = f \times Vno + g \quad [1.4]$$

This final pressure in the tank, which represents a level of the product, can then be relayed and/or reported to a user, sent to a data center, and the like. If not already done, the temperature that was previously calculated can also be dispatched along with the newly calculated pressure.

As the above explanation and equations illustrate, the pressure that has been calculated is not directly compensated with the either the calculated or a measured temperature. In fact, it should be noted that none of equations [1.2], [1.3], and [1.4] include a temperature variable. Instead, the relationship of bridge resistance to output bridge voltage over different temperature points provided by the sensor manufacturer is used in order to get the corrected pressure shown in equation 1.4.

In a preferred embodiment, the gain of the A/D converter 14 is set low or near a lower end of the gain range when the temperature is determined (FIG. 1) and high or near a high end of the gain range when the pressure (FIG. 2) is determined. Also, in a preferred embodiment, the A/D converter 14 operates to filter out external noise.

Finally, the reference resistive device 16, the gain selected during particular measurements, and the maximum tolerance of the resistive devices 30, 32, 34, 36 should be carefully considered to avoid overflowing or saturating the inputs 38, 40, 42, 44 of the A/D converter 14. This is particularly true when a temperature measurement (FIG. 1) is taken for a high temperature (i.e., when the resistive values of the resistive devices 30, 32, 34, 36 are high) so as not to sacrifice resolution at low pressures.

As those skilled in the art will appreciate, the circuit 10 provides a pressure transducer 12 (i.e., a sensor) that is adapted for use within a tank, is less expensive than commercially available sensors, and employs only passive components.

Further, for typical sensor calibration, eighteen measurements (six different pressure measurements at three different temperatures) must be obtained. In contrast, circuit 10 calibration needs only four measurements because linear functions are employed. By having to take fewer readings, both time and money are saved when calibrating a sensor.

Additionally, temperature calibration typically requires three measurements of bridge resistance at three temperatures. However, since the shape produced by the temperature equation [1.1] is generally the same for a particular type of sensor, only two temperature measurements are needed to calculate coefficients for a particular sensor.

All references, including publications, patent applications, and patents cited herein are hereby incorporated by reference to the same extent as if each reference were individually and specifically indicated to be incorporated by reference and were set forth in its entirely herein. In particular, co-pending U.S. patent application Ser. No. 11/199,761, entitled PRESSURE AND TEMPERATURE MEASUREMENT OF A PIEZO-RESISTIVE DEVICE USING DIFFERENTIAL CHANNEL OF A RATIOMETRIC ANALOG TO DIGITAL CONVERTER, filed on even date herewith, is incorporated by this reference.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of determining a temperature and a pressure in a tank, the method comprising the steps of:
   obtaining sensor data;
   calculating coefficients;
   ratiometrically determining a bridge resistance from a bridge voltage;
   calculating the temperature with selected ones of the coefficients and the bridge resistance;
   transitioning from a temperature measurement mode to a pressure measurement mode;
   calculating a voltage per resistance with selected ones of the coefficients and a differential voltage;
   indirectly compensating for temperature by calculating a normalized voltage using the voltage per resistance, the differential voltage, and the bridge resistance;
   calculating the pressure with selected ones of the coefficients and the normalized voltage, the pressure representing a parameter of a product in the tank; and
   relaying the temperature to one of a user and a data center.

2. The method of claim 1, wherein the method further comprises the step of storing the coefficients.

3. The method of claim 1, wherein the step of calculating coefficients is performed by using the sensor data and a polynomial temperature equation.

4. The method of claim 3, wherein the step of calculating coefficients is performed by using a voltage per resistance equation and a pressure equation.

5. The method of claim 1, wherein the step of calculating coefficients is performed by using the sensor data and a second order polynomial temperature equation.

6. A method of determining a temperature and a pressure in a tank, the method comprising the steps of:
- obtaining sensor data;
- calculating coefficients;
- ratiometrically determining a bridge resistance from a bridge voltage;
- calculating the temperature with selected ones of the coefficients and the bridge resistance;
- transitioning from a temperature measurement mode to a pressure measurement mode;
- calculating a voltage per resistance with selected ones of the coefficients and a differential voltage;
- indirectly compensating for temperature by calculating a normalized voltage using the voltage per resistance, the differential voltage, and the bridge resistance;
- calculating the pressure with selected ones of the coefficients and the normalized voltage, the pressure representing a parameter of a product in the tank; and
- relaying the pressure to one of a user and a data center.

7. A method of determining a temperature and a pressure in a tank, the method comprising the steps of:
- obtaining sensor data;
- calculating coefficients;
- ratiometrically determining a bridge resistance from a bridge voltage;
- calculating the temperature with selected ones of the coefficients and the bridge resistance;
- transitioning from a temperature measurement mode to a pressure measurement mode;
- calculating a voltage per resistance with selected ones of the coefficients and a differential voltage;
- indirectly compensating for temperature by calculating a normalized voltage using the voltage per resistance, the differential voltage, and the bridge resistance; and
- calculating the pressure with selected ones of the coefficients and the normalized voltage, the pressure representing a parameter of a product in the tank; and
- wherein the sensor data comprises one or more of a first temperature, a first pressure, a second temperature, a second pressure, a third temperature, a third pressure, first, second, and third voltages, and first, second, and third pressures.

8. A method of determining a temperature compensated pressure in a tank, the method comprising the steps of:
- obtaining sensor data;
- calculating first coefficients for a voltage per resistance equation with the sensor data;
- calculating second coefficients for a pressure equation with the sensor data;
- measuring a differential voltage;
- calculating a voltage per resistance with the voltage per resistance equation using the first coefficients and the differential voltage;
- calculating a normalized voltage with a normalized voltage equation using the voltage per resistance, the differential voltage, and the bridge resistance; and
- calculating the temperature compensated pressure with the second coefficients and the normalized voltage, the temperature compensated pressure representing a level of a product in the tank.

9. The method of claim 8, further comprising the step of calculating a temperature in a tank comprising the steps of:
- calculating third coefficients for a temperature equation with the sensor data;
- measuring a bridge voltage;
- ratiometrically determining a bridge resistance with the bridge voltage;
- calculating a temperature with the temperature equation using the third coefficients and the bridge resistance.

10. The method of claim 9, wherein the method further comprises the step of relaying at least one of the temperature and the pressure to a user.

11. The method of claim 9, wherein the third coefficients consists of three coefficients.

12. The method of claim 9, wherein the method further comprises employing an additional second order temperature polynomial to compensate for errors.

13. The method of claim 9, wherein the method further comprises the step of storing at least one of the first, second, and third coefficients.

14. The method of claim 8, wherein the method further comprises the step of reporting the pressure to at least one of a user and a data center.

15. The method of claim 8, wherein the first coefficients consists of two coefficients and the second coefficients consist of two coefficients.

16. The method of claim 8, wherein the voltage per resistance equation and the pressure equation are free of a temperature variable.

17. A method of determining a temperature in a tank, the method comprising the steps of:
- obtaining sensor data;
- calculating first coefficients for a temperature equation with the sensor data;
- measuring a bridge voltage;
- ratiometrically determining a bridge resistance with the bridge voltage;
- calculating a temperature using the first coefficients and the bridge resistance, the temperature providing an indication of the temperature in the tank; and
- determining a pressure in a tank comprising the steps of:
- calculating second coefficients for a voltage per resistance equation with the sensor data;
- calculating third coefficients for a pressure equation with the sensor data;
- measuring a differential voltage;
- calculating a voltage per resistance with the voltage per resistance equation using the second coefficients and the differential voltage;
- indirectly calculating a normalized voltage with a normalized voltage equation using the voltage per resistance, the differential voltage, and the bridge resistance; and
- calculating a pressure with the third coefficients and the normalized voltage.

18. A method of determining a temperature in a tank, the method comprising the steps of:
- obtaining sensor data;
- calculating first coefficients for a temperature equation with the sensor data;
- measuring a bridge voltage;
- ratiometrically determining a bridge resistance with the bridge voltage;
- calculating a temperature using the first coefficients and the bridge resistance, the temperature providing an indication of the temperature in the tank; and
- relaying the temperature to one of a user and a data center.

* * * * *